(12) United States Patent
Dellve et al.

(10) Patent No.: US 6,787,497 B2
(45) Date of Patent: Sep. 7, 2004

(54) CHEMICAL PRODUCT AND PROCESS

(75) Inventors: Anna-Carin Dellve, Göteborg (SE);
Bozena Tokarz, Kungälv (SE); Mats Nyström, Ytterby (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/964,358

(22) Filed: Sep. 28, 2001

(65) Prior Publication Data

US 2003/0056912 A1 Mar. 27, 2003

Related U.S. Application Data

(60) Provisional application No. 60/238,012, filed on Oct. 6, 2000.

(51) Int. Cl.$^7$ ............................. B01J 21/16; B01J 29/04; B01J 21/08; B01J 21/04
(52) U.S. Cl. ............................. 502/84; 502/87; 502/233; 502/250; 502/243; 502/439
(58) Field of Search ............................. 502/84 OR, 87, 502/233, 250, 243, 439

(56) References Cited

U.S. PATENT DOCUMENTS

| | | | |
|---|---|---|---|
| 4,391,667 A | 7/1983 | Vangbo | 156/205 |
| 4,520,124 A | 5/1985 | Abe | 502/159 |
| 4,521,531 A | 6/1985 | Coates | 502/242 |
| 4,552,748 A | 11/1985 | Berglin | 423/588 |
| 4,800,073 A | 1/1989 | Bengtsson | 423/588 |
| 4,800,074 A | 1/1989 | Bengtsson | 423/588 |
| 5,017,316 A * | 5/1991 | Sowman | 264/622 |
| 5,063,043 A | 11/1991 | Bengtsson | 423/588 |
| 5,194,414 A * | 3/1993 | Kuma | 502/80 |
| 6,025,298 A * | 2/2000 | Imoto et al. | 502/300 |
| 6,524,680 B1 * | 2/2003 | Tanaka et al. | 428/116 |

FOREIGN PATENT DOCUMENTS

| | | |
|---|---|---|
| EP | 0398765 | 11/1990 |
| EP | 0398766 | 11/1990 |
| EP | 0878235 | 11/1998 |
| JP | 58-17841 | 2/1983 |
| JP | 58-153538 | 9/1983 |
| JP | 61-242642 | 10/1986 |
| WO | 97/31710 | 9/1997 |

OTHER PUBLICATIONS

Ullmann's Encyclopedia of Industrial Chemistry, Fifth, Completely Revised Edition, vol. A23: Refractory Ceramics to Silicon Carbide, pp. 672, 702–706.
Encyclopedia of Chemical Technology, Foiurth Edition, vol. 13, Helium Group to Hypnotics, pp. 961–995.
WPI/Derwent Abstract of J61242642.
Patent Abstracts of Japan: of Publication Num 61242642.
WPI/Derwent Abstract of J58153538.
PAJ/JPO Abstract of JP58153538.
Patent Abstracts of Japan of Publication No. 58153538.
WPI/Derwent Abstract of J58017841.
Patent Abstracts of Japan of Publication No. 58017841.
Gerhartz, W. (EX. ED.): Ullmann's Encyclopedia of Industrial Chemistry, Fifth, Completely Revised Edition, vol. A7: "Clays," pp. 126–136.
Elvers, B. et al (EDS.): Ullmann's Encyclopedia of Industrial Chemistry, Fifth, Completely Revised Edition, vol. A18, "Paints and Coatings," pp. 462–463.
Patent Abstracts of Japan, abstract of Publication No. 10015396.

* cited by examiner

Primary Examiner—Steven Bos
Assistant Examiner—William G. Wright, Sr.
(74) Attorney, Agent, or Firm—David J. Serbin

(57) ABSTRACT

The invention concerns a catalyst carrier comprising a fibre paper impregnated with a slurry comprising silica sol, micro fibres and a filler, wherein said micro fibres have an equivalent average particle size, measured with sedigraph method, from about 200 nm to about 30000 nm and said filler has an average equivalent particle size, measured with sedigraph method, from about 300 to about 10000 nm. The invention further concerns a method of its preparation, a slurry useful therefore, a catalyst comprising such a catalyst carrier and use of the catalyst.

11 Claims, No Drawings

CHEMICAL PRODUCT AND PROCESS

This application claims the benefit of Provisional Application No. 60/238,012 filed Oct. 6, 2000.

The present invention relates to a catalyst carrier, preparation thereof, a slurry for use at preparation thereof, a catalyst comprising such a carrier, and use of the catalyst carrier for producing hydrogen peroxide.

Many chemical processes involve reactions in gas and/or liquid phase in contact with a solid catalyst. Such a catalyst often comprises a carrier on which a catalytically active material is deposited. The carrier serves the purpose of facilitating the handling of the catalyst and rendering the surface to volume ratio high. The carrier can be in the form of particles (orientated with randomness when placed in a catalytic reactor) or in the form of structured bodies (free of randomness when placed in a catalytic reactor).

Structured bodies are particularly easy to handle and can be prepared from a fibre paper impregnated with a support material, on which a catalytically active material can be deposited. WO 97/31710 describes preparation of a catalyst carrier by impregnating a mineral fibre paper with a dispersion of a filling material, a sol and a dispersing medium.

In processes involving gas-liquid reactions the catalyst is subjected to significant mechanical stress and it is hard to produce a structured body having sufficient durability. One examples of such a gas liquid reaction is the hydrogenation of anthraquinones or derivatives thereof, which is an important step in the anthraquinone process for production of hydrogen peroxide.

It is an object of the present invention to provide a catalyst carrier that can be used for preparing a structured catalyst body with high efficiency as well as high and durable mechanical strength.

It is another object of the invention to provide an improved process for performing catalytic reactions in the presence of at least one liquid and preferably at least one gas.

It is still another object to provide an improved process for producing hydrogen peroxide, particularly according to the anthraquinone process.

Thus, in one aspect the invention concerns a catalyst carrier comprising a fibre paper impregnated with a preferably aqueous slurry containing a silica sol, micro fibres and a filler, wherein said micro fibres have an equivalent average particle size, measured with sedigraph method, from about 200 nm to about 30000 nm, preferably from about 500 nm to about 10000 nm. The filler has an average equivalent particle size, measured with sedigraph method, from about 300 to about 10000 nm, preferably from about 1000 to about 4000 nm. In the sedigraph method the equivalent average particle size is determined by sedimentation and evaluated at 50% cumulative mass percent as equivalent spherical diameter in accordance with Stokes Law. Preferably the average length to diameter ratio of the micro fibres is from about 3:1 to about 40:1, most preferably from about 6:1 to about 20:1, as measured on microscope image.

The invention further concerns a method for preparing a catalyst carrier comprising a step of impregnating a fibre paper with a slurry as defined above.

The invention also concerns a slurry as defined above, which can be used for preparing a catalyst carrier.

It has been found that the presence of micro fibres within the above equivalent size and length to diameter ranges significantly improves the durability of structural strength of the catalyst carrier, particularly at long term use in contact with a flowing liquid-gas mixture.

Suitable micro fibres may be selected from glass fibres, ceramic fibres or mineral fibres such as halloysite, palygorskite, wollastonite or mixtures thereof, provided they fulfil the above requirement with respect to equivalent particle size and preferred length to diameter ratio.

The silica both acts as a binder and provides the actual support material with high surface area in the final catalyst carrier on which a catalytically active material can be deposited.

Suitable silica sols are aqueous and preferably have an average particle size from about 5 to about 100 nm, most preferably from about 10 to about 70 nm. The preferred silica sol should have a broad particle size distribution. Suitably the relative standard deviation of the particle size distribution in the sol is at least about 15% by numbers, preferably at least about 30%, and may, for example, be up to about 140% by numbers or more. The relative standard deviation of the particle size distribution corresponds to the ratio between the standard deviation of the particle size distribution and the average particle size by numbers, and may be measured by use of the dynamic light scattering method. It is also possible to use mixtures of silica sols with different average particle size and/or particle size distributions. The average particle size of a silica sol with broad particle size distribution is defined as the particle diameter in a monodispers silica sol with spherical particles having the same surface area (as measured with Sears titration method) per dry weight of silica sol. The silica sols could be anionic, cationic or de-ionised. Preferred silica sols are anionic and mainly stabilised with ions of ammonia, potassium and/or sodium, or mixtures thereof, at a pH above 7. The preferred amount of silica sol (counted as $SiO_2$) in the slurry is from about 40% to about 90%, most preferably from about 50% to about 80% by weight (as dry weight).

Suitable fillers may, for example, be selected from talc or clay minerals, such as bentonite or members of the smectite—or kaolin groups, or mixtures thereof. The preferred shape of the filler particles is close to equidimensional, i.e. the shape has no significant elongation. Preferably the average length to diameter ratio of filler particles is less than 3:1, most preferably less than 2:1, as measured on microscope image. It has been found that the presence of a filler both increases the life time of the slurry before sedimentation starts and improves the durability and mechanical strength of the final catalyst carrier.

The preferred total amount of micro fibres and filler in the slurry is from about 10% to about 60%, most preferably from about 20% to about 50% by dry weight. Preferably the weight ratio of filler to micro fibres is from 0 to about 3:1, most preferably from about 1:3 to about 2:1.

The main part of the fibres in the actual fibre paper to be impregnated are preferably longer than the micro fibres used in the impregnation slurry, for examples having a true fibre diameter from about 0.001 to about 0.030 mm, preferably from about 0.002 to about 0.015 mm and a length exceeding about 1 mm, preferably exceeding about 3 mm. There is no critical upper limit on the fibre length, which, for example, may be up to 100 mm, 1000 mm or more. The fibre paper is preferably made of mineral—or glass fibres. Such fibre papers are described in the literature, for example in the above mentioned WO 97/31710 and in U.S. Pat. No. 4,391,667.

The slurry used for impregnating the fibre paper can be prepared by any conventional means, for example by adding, under agitation, the silica sol, the micro fibres and the filler to a liquid, preferably water, to yield a substantially homogeneous slurry with a preferred total dry content from about 35% to about 75%, most preferably from about 45% to about 70%. The fibre paper is impregnated with the slurry by any suitable means, for example by spraying or dipping, and then suitably dried to evaporate water so the silica sol gels, for example at a temperature bellow about 120° C., preferably from about 20° C. to about 100° C. and suitably a sufficiently long time to remove essential all free water. The gelling may be speeded up by adding salts of, for example, acetate or nitrate of aluminium, zirconium, magnesium, calcium and/or ammonia. Although not necessary it is possible to also supply further additives such as silicates, sulfates, phosphates, or carbonates of alkali metals or the corresponding acids, for instance in order to adjust pH. The impregnation and drying steps may be repeated once, twice or several times to increase the amount of solids on the fibre paper. After the first and/or after the optional second or further impregnation and drying steps, it is possible to heat the impregnated fibre paper in oxidising atmosphere up to a high temperature, for example up to from about 450° C. to about 850° C., preferably from about 500° C. to about 750° C. during a sufficiently long time to substantially remove all organic materials that might be present, which time in most cases is from about 0.2 to about 5 hours. The impregnated and dried fibre paper may also be further impregnated with a silica sol without filler and micro fibres and then dried, which has been found to improve properties of the final catalyst carrier.

The fibre paper to be impregnated may, for example, be substantially flat or corrugated and can, before or after the impregnation, be formed to a structured body preferably provided with through channels having any suitable cross section shape, for example circular, sinusoidal, square, trapezoidal or triangular and preferably with an average diameter from about 0.5 to about 10 mm, most preferably from about 1 to about 3 mm. For example, it is possible to combine flat and corrugated sheets of the impregnated or non-impregnated fibre paper to bodies with substantially parallel through channels (i.e. a monolithic body) as described in WO 97/31710 or U.S. Pat. No. 4,552,748. It is also possible to produce structured bodies with other shapes, for example provided with through channels substantially parallel to the intended main flow of reactants at use in a chemical reactor and passages perpendicular to this direction, or non-parallel channels such as in a static mixer. Structured bodies with substantially parallel through channels are most preferred.

A catalyst carrier as prepared as described above has a porous structure of silica reinforced with the filler and the micro fibres. The total content of silicon measured as $SiO_2$ after ignition at 1000° C. (to remove substantially all water and organic material) is preferably from about 70% to about 92%, most preferably from about 75% to about 88% by weight, while the total content of calcium and magnesium measured as CaO plus MgO after ignition preferably is less than about 24%, most preferably less than about 18% by weight. The total content of aluminium measured as $Al_2O_3$ after ignition preferably is from about 1% to about 30%, most preferably from about 2% to about 20% by weight, while the total content of sodium, potassium and iron measured as $Na_2O$ plus $K_2O$ plus $Fe_2O_3$ after ignition preferably is less than about 3%, most preferably less than about 2% by weight. The specific surface area (BET-method) is preferably from about 10 m$^2$/g to about 300 m$^2$/g, most preferably from about 30 m$^2$/g to about 200 m$^2$/g. The catalyst carrier shows superior mechanical strength and durability during long term use in chemical processes.

The invention also concerns a preferably structured catalyst comprising a catalyst carrier as described above on which at least one catalytically active material is deposited, for example in an amount from about 0.1% to about 50%, preferably from about 0.2% to about 25% by weight. Suitable catalytically active materials may, for example, be selected among metals or mixtures of metals (preferably in there metal-, oxide- and/or sulfide forms) from Groups 8B and 1B in the periodic table, preferably nickel, palladium, platinum, cobalt, rhodium, ruthenium, gold, silver, or mixtures thereof, most preferably at least one of nickel, palladium, platinum and gold, of which palladium or mixtures comprising at least 50 wt % palladium are particularly preferred.

The invention further concerns for preparing a structured catalyst as described above comprising a step of depositing at least one catalytically active material on a catalyst carrier as also described above. The deposition may be performed by methods known per se, for example including the steps of impregnating the catalyst carrier with a solution of a catalytically active metal and then subjecting the impregnated carrier to a reducing agent and thereby precipitating the metal. Suitable methods are described in the literature, for example in U.S. Pat. No. 4,521,531 or EP 878235.

Furthermore, the invention concerns use of a preferably structured catalyst as described above in a chemical process involving contact of the catalyst with at least one liquid and preferably at least one gas and at least one liquid. One or more blocks of structured catalyst as described above may then form a bed in a reactor, through which the reactants preferably are brought to flow co-currently. Examples of such processes include catalytic hydrogenation to reduce nitrate, nitrite to nitrogen in aqueous solutions and reactions carried out with structured catalyst in form of immobilised biocatalyst (e.g. enzyme, cells).

In an advantageous aspect of the invention, the catalyst is used in a process for hydrogenating an organic compound in liquid phase, for example dissolved in a liquid solvent, which is brought to react with hydrogen in gas phase in contact with a catalyst as described above. Examples of such process are hydrotreatment of pyrolysis gasoline, hydrogenation of nitrobenzene to aniline and fat hardening.

An particularly advantageous aspect of the invention concerns a process for producing hydrogen peroxide according to the anthraquinone process involving alternate oxidation and hydrogenation of anthraquinones or derivatives thereof in a working solution of organic solvents, wherein working solution and gaseous hydrogen are brought to flow through a bed of at least one structured catalyst as described above.

The hydrogenation is suitably performed at a temperature from about 0 to about 100° C., preferably from about 40 to about 70° C., and at a pressure from about 10 to about 1500 kPa, preferably from about 200 to about 600 kPa. Preferably alkylated anthraquinones such as 2-alkyl-9,10-anthraquinones, and/or their tetrahydro forms, are used. Examples of useful alkyl-anthraquinones are 2-ethylanthraquione, 2-tert-butylanthraquione, 2-hexenylanthraquione, eutectic mixtures of alkylanthraquiones, mixtures of 2-amylanthraquiones, and their tetrahydro derivatives. The working solution suitably comprises one or more quinone solvents and one or more hydroquinone solvents. Suitable quinone solvents may include aromatic, aliphatic or naphthenic hydrocarbons, for example benzene, alkylated or polyalkylated benzenes such as tert-butylbenzene or trimethyl benzene, alkylated toluene or naphthalene such as tert-butyltoluene or methylnaphthalene. Suitable hydroquinone solvents may include alkyl phosphates, alkyl phosphonates, nonyl alcohols, alkylcyclohexanol esters, N,N, dialkyl carbonamides, tetraalkyl ureas, N-alkyl-2-pyrrolidones. Particularly preferred hydroquinone solvents are described in the U.S. Pat. Nos. 4,800,073 and 4,800,074 and include alkylsubstituted caprolactams and cyclic urea derivatives such as N,N'-dialkylsubstituted alkylenurea.

Further details about the anthraquinone process can be found in the literature, for example in Kirk-Othmer, "Encyclopedia of Chemical Technology", 4th Ed., 1993, Vol. 13, pp. 961–995, U.S. Pat. No. 4,552,748 and U.S. Pat. No. 5,063,043

It has been found that a catalyst according to the invention has high activity and long term stability even if subjected for significant mechanical stress such as at the hydrogenation step in the anthraquinone process for production of hydrogen peroxide.

The invention will now be described in connection with the following examples, which however, not should be interpreted as limiting the scope of the invention.

EXAMPLE

Aqueous slurries A through F were prepared by adding a silica sol and one or more further additives to water and maintaining the mixture under agitation until a homogeneous slurry was obtained. As a reference a pure silica sol was used in sample G. The silica sol in all the samples was anionic, had a $SiO_2$ content of 50 wt %, a pH of 8.5 to 10 and a wide particle size distribution with particle sizes from about 10 nm to about 200 nm, a relative standard deviation by numbers at 42% and an average particle size of about 35 nm.

A 16 kg of water, 84 kg of silica sol and 11 kg of ceramic micro fibre with alumino-silicate composition were mixed to a slurry. Ceramic fibres with fibre diameter of 1000 to 5000 nm and with length to diameter ratio 10 and higher were used. The stability and uniformity was only fair but the slurry could anyhow be used for impregnating fibre paper bodies.

B 84 kg of the same silica sol as in A, 30 kg of silica sol"12" and 30 kg mineral fibre of wollastonite were mixed to a slurry. The silica sol"12" had a $SiO_2$ content of 40 wt % and was monodispers with an average particle size of 12 nm. Mineral fibre with equivalent average particle size of 4300 nm and with length to diameter ratio of about 8:1 was used. The stability and uniformity was only fair but the slurry could anyhow be used for impregnating fibre paper bodies.

C The same slurry composition as for B was used, with the exception that the equivalent average particle size of mineral fibre was about 20000 nm and length to diameter ratio was about 6:1. The stability and uniformity was fair but this slurry did not give a fully uniform impregnation of the fibre paper body.

D 6 kg of the same silica sol as in A, 0.6 kg of same mineral fibre of wollastonite as in B and 0.4 kg of mineral fibre of palygorskite were mixed to a slurry. Palygorskite with fibre diameter of about 100 nm and with length to diameter ratio about 10 was used. The stability and uniformity was good and the slurry could be used for impregnating fibre paper bodies.

E 100 kg of the same silica sol as in A, 10 kg of same mineral fibre of wollastonite as in B and 20 kg filler of kaolin were mixed to a slurry. Filler of kaolin with an average equivalent particle size of 2000 nm was used. The stability and uniformity was good and the slurry could be used for impregnating fibre paper bodies.

F The same slurry composition as for E was used, with the exception that the filler of kaolin had an average equivalent particle size of 400 nm. The stability and uniformity was good and the slurry could be used for impregnating fibre paper bodies.

G The same silica sol as in A was used without dilution or additives. The stability and uniformity was excellent and could be used for impregnating fibre paper bodies.

| Slurry sample: | A | B | C | D | E | F | G |
|---|---|---|---|---|---|---|---|
| Solid content wt % | 47.5% | 55% | 55% | 56% | 60% | 60% | 50% |

Flat and corrugated sheets of mineral fibre paper were combined to structured bodies with substantially parallel through channels with a diameter of 1–3 mm (i.e. a monolithic body) as described in U.S. Pat. No. 4,552,748. Each one of the above samples were used for preparing catalyst carriers by dipping therein such equally structured bodies of mineral fibre paper followed by drying in air for 70 to 360 minutes at 40 to 90° C. and heating in air for 120 to 300 minutes to a maximum temperature of 500 to 600° C. For "sample A" dipping and drying was repeated once. For "sample G" dipping and drying was repeated three times.

The BET surface and composition were determined for each impregnated piece. The mechanical strength was classified as "excellent", "good", "fair" or "poor" by pressing a rod with a diameter of 15 mm into the pieces. Erosion rate was measured by passing gas and liquid through the monolithic bodies until damage due to lost solid material could be detected. Catalytic activity was measured in a bench scale reactor for hydrogenation of working solution from an anthraquinone process. Equal amount of palladium was deposited on the monolithic bodies prior to hydrogenation. The results appear in the table below:

| Sample | BET ($m^2$/g) | SiO2 (wt %) | $Al_2O_3$ (wt %) | CaO + + MgO (wt %) | $Na_2O$ + + $K_2O$ + $Fe_2O_3$ (wt %) | Mechanical strength | Erosion rate (rel. G) | Catalytic activity (rel. G) |
|---|---|---|---|---|---|---|---|---|
| A | 55 | 85% | 10% | 3% | <1% | Excellent | 50% | 75% |
| B | 50 | 77% | 2% | 19% | <1% | Excellent | <35% | 85% |
| C[1] | — | 77% | 2% | 19% | <1% | — | — | — |
| D | — | 83% | 4% | 10% | 1% | Fair | (high) | — |
| E | 40 | 79% | 10% | 8% | 1% | Good | <25% | 110% |
| E-plus[2] | 40 | 78% | 10% | 9% | 1% | Poor | — | 100% |
| F[3] | — | 79% | 10% | 8% | 1% | Fair | — | — |
| G | 71 | — | — | — | — | Excellent | 100% | 100% |

[1]Could not be tested because some of the relatively thin channels were plugged.
[2]Was not tested for erosion rate.
[3]Was not tested for erosion rate or catalytic activity.

Sample "E-plus" was prepared as sample "E" with the exception that between the dipping in slurry and the drying the structured body was dipped in an aqueous solution of 3.3 wt % of magnesium acetate for 8 minutes at room temperature.

It is concluded that samples including micro fibres in the slurry showed a considerably lower rate of erosion. Rate of erosion is also lower in samples with less initial mechanical strength, as found with sample E. It is also concluded that a high catalytic activity can be maintained even when micro fibres are included in the structure.

What is claimed is:

1. A catalyst carrier comprising a fibre paper impregnated with a slurry comprising silica sol, micro fibres and a filler, wherein said micro fibres have an equivalent average particle size, measured with sedigraph method, from about 200 nm to about 30000 nm and said filler has an average equivalent particle size, measured with sedigraph method, from about 300 to about 10000 nm, and wherein the main part of the fibres in the fibre paper to be impregnated are longer than the micro fibres used in the impregnation slurry.

2. A catalyst carrier as claimed in claim 1, wherein said micro fibres have an equivalent average particle size, measured with sedigraph method, from about 500 nm to about 10000 nm.

3. A catalyst carrier as claimed in claim 1, wherein the average length to diameter ratio of the micro fibres is from about 3:1 to about 40:1, as measured on microscope image.

4. A catalyst carrier as claimed in claim 1, wherein said micro fibres are selected from glass fibres, ceramic fibres, mineral fibres, or mixtures thereof.

5. A catalyst carrier as claimed in claim 1, wherein said micro fibres are mineral fibres selected from halloysite, palygorskite, wollastonite, or mixtures thereof.

6. A catalyst carrier as claimed in claim 1, wherein the filler has an equivalent average particle size, measured with sedigraph method, from about 1000 nm to about 4000 nm.

7. A catalyst carrier as claimed in claim 1, wherein the tiller particles are close to equidimensional and the average length to diameter ratio of filler particles is less than 3:1, as measured on microscope image.

8. A catalyst carrier as claimed in claim 1, wherein said filler is selected from talc, bentonite or members of the smectite—or kaolin groups of clay minerals, or mixtures thereof.

9. A catalyst carrier as claimed in claim 1, wherein it is in the form of a structured body provided with through channels.

10. A catalyst carrier comprising a fibre paper impregnated with a slurry comprising silica sol, micro fibres and a filler, wherein said micro fibres have an equivalent average particle size, measured with sedigraph method, from about 200 nm to about 30000 nm, the average length to diameter ratio of the micro fibres is from about 3:1 to about 40:1, as measured on microscope image, and said filler has an average equivalent particle size, measured with sedigraph method, from about 300 to about 10000 nm.

11. A catalyst carrier according to claim 10, wherein said filler is selected from talc, bentonite or members of the smectite- or kaolin groups of clay minerals, or mixtures thereof.

* * * * *